United States Patent
Kim et al.

(10) Patent No.: US 11,573,828 B2
(45) Date of Patent: Feb. 7, 2023

(54) EFFICIENT AND SCALABLE ENCLAVE PROTECTION FOR MACHINE LEARNING PROGRAMS

(71) Applicant: NEC Laboratories America, Inc., Princeton, NJ (US)

(72) Inventors: Chung Hwan Kim, Franklin Park, NJ (US); Junghwan Rhee, Princeton, NJ (US); Xiao Yu, Princeton, NJ (US); Luan Tang, Pennington, NJ (US); Haifeng Chen, West Windsor, NJ (US); Kyungtae Kim, West Lafayette, IN (US)

(73) Assignee: NEC Corporation

( * ) Notice: Subject to any disclaimer, the term of this patent is extended or adjusted under 35 U.S.C. 154(b) by 387 days.

(21) Appl. No.: 16/816,715

(22) Filed: Mar. 12, 2020

(65) Prior Publication Data
US 2021/0081122 A1 Mar. 18, 2021

Related U.S. Application Data

(60) Provisional application No. 62/900,686, filed on Sep. 16, 2019, provisional application No. 62/927,724, filed on Oct. 30, 2019.

(51) Int. Cl.
*G06F 9/50* (2006.01)
*G06F 11/34* (2006.01)
*G06N 3/04* (2006.01)

(52) U.S. Cl.
CPC ........ *G06F 9/5016* (2013.01); *G06F 11/3433* (2013.01); *G06N 3/04* (2013.01)

(58) Field of Classification Search
CPC .... G06F 9/5016; G06F 11/3433; G06F 9/544; G06N 3/04; G06N 3/082; G06N 3/063
See application file for complete search history.

(56) References Cited

U.S. PATENT DOCUMENTS

| | | | |
|---|---|---|---|
| 10,019,668 B1* | 7/2018 | Woo | G06N 3/08 |
| 2018/0211035 A1* | 7/2018 | Costa | G06F 21/74 |
| 2020/0082259 A1* | 3/2020 | Gu | G06N 3/0454 |
| 2020/0082270 A1* | 3/2020 | Gu | G06N 3/0427 |
| 2020/0082279 A1* | 3/2020 | Arora | G06N 5/04 |
| 2021/0192360 A1* | 6/2021 | Bitauld | H04L 63/04 |

OTHER PUBLICATIONS

Tople et al., PRIVADO: Practical and Secure DNN Inverence with Enclaves, (Year: 2018).*

Arnautov et al., "SCONE: Secure Linux Containers with Intel SGX", Proceedings of the 12th USENIX Symposium on Operating Systems Design and Implementation (OSDI '16). Nov. 2-4, 2016. (pp. 689-703.).

(Continued)

*Primary Examiner* — Jorge A Chu Joy-Davila
(74) *Attorney, Agent, or Firm* — Joseph Kolodka

(57) ABSTRACT

A computer-implemented method for efficient and scalable enclave protection for machine learning (ML) programs includes tailoring at least one ML program to generate at least one tailored ML program for execution within at least one enclave, and executing the at least one tailored ML program within the at least one enclave.

17 Claims, 6 Drawing Sheets

(56) References Cited

OTHER PUBLICATIONS

Grover et al. "PRIVADO: Practical and Secure DNN Inference with Enclaves", arXiv preprint arXiv: 1810.00602v2. [cs.CR] Sep. 5, 2019. pp. 1-18.).

Gu et al., "Reaching Data Confidentiality and Model Accountability on the CalTrain", 2019 49th Annual IEEE/IFIP International Conference on Dependable Systems and Networks (DSN) Jun. 24, 2019. (pp. 336-348).

Kunkel et al., "TensorSCONE: A Secure TensorFlow Framework using Intel SGX", arXiv:1902.04413v1. [cs.CR] Feb. 12, 2019. (pp. 1-12.).

Orenbach et al., "Eleos: ExitLess OS Services for SGX Enclaves", Proceedings of the Twelfth European Conference on Computer Systems. Apr. 23, 2017. (pp. 238-253.).

Shaon et al., "SGX-BigMatrix: A Practical Encrypted Data Analytic Framework With Trusted Processors", Proceedings of the 2017 ACM SIGSAC Conference on Computer and Communications Security. Oct. 30, 2017. (pp. 1211-1228).

Taassori, et al., "VAULT: Reducing Paging Overheads in SGX with Efficient Integrity Verification Structures", Proceedings of the Twenty-Third International Conference on Architectural Support for Programming Languages and Operating Systems, Mar. 19, 2018. (pp. 1-14.).

* cited by examiner

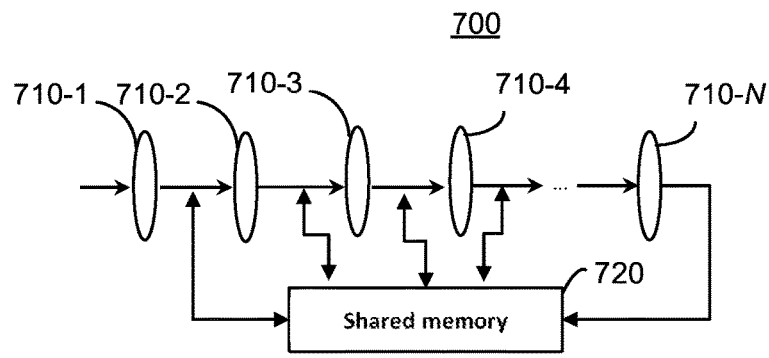
FIG. 7
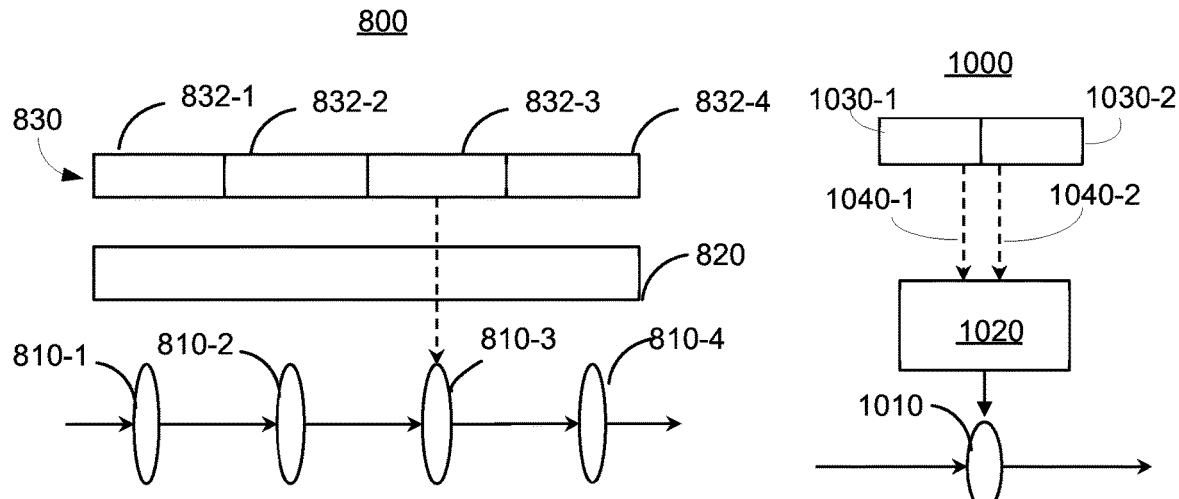
FIG. 8
FIG. 10
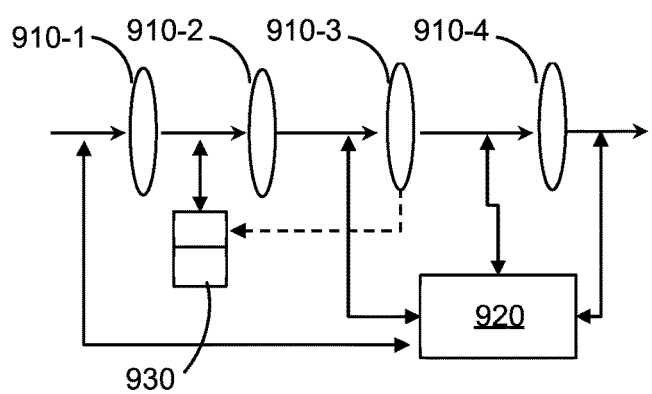
FIG. 9

1300

Input: $N$ - given network architecture
    // $L.I$, $L.O$ and $L.W$ are input, output and model buffer size of current layer.
1: function INSPECTFORWARDNETWORK($N$)
2:     $L \leftarrow N.layer$ // 1st layer
3:     $max \leftarrow 0$
4:     while $L \neq$ null do
5:         if $L.O$ is not reused then
6:             $t \leftarrow L.W + L.I + L.O$
7:         else
8:             $t \leftarrow L.W + L.I$
9:         if $t \geq max$ then
10:            $max \leftarrow t$
11:        $L \leftarrow L.next$
12:    return $max$
Output: $max$ - optimal size of shared memory

FIG. 13

EFFICIENT AND SCALABLE ENCLAVE PROTECTION FOR MACHINE LEARNING PROGRAMS

RELATED APPLICATION INFORMATION

This application claims priority to provisional application Ser. No. 62/900,686, filed on Sep. 16, 2019, and provisional application Ser. No. 62/927,724, filed on Oct. 30, 2019, incorporated by reference herein in their entirety.

BACKGROUND

Technical Field

The present invention relates to machine learning and computer security, and more particularly to efficient and scalable enclave protection for machine learning programs.

Description of the Related Art

Artificial intelligence (AI) systems based on machine learning (ML) models (e.g., deep learning (DL) models) are widely used in many applications, such as, e.g., facial recognition, intelligent personal assistants, and object detection. Many of these systems run in a shared computing environment (e.g., a cloud infrastructure), for cost reduction and scalability. Despite the benefits, the increasing frequency of sophisticated data breaches in the cloud and the emergence of new attacks to steal machine learning data have led to concerns regarding running privacy-sensitive AI systems within untrusted computing environments. While encryption can protect this data in disks and networks, it can be difficult to protect this data while they are in use during computations.

SUMMARY

According to an aspect of the present principles, a computer-implemented method is provided for efficient and scalable enclave protection for machine learning (ML) programs. The method includes tailoring at least one ML program to generate at least one tailored ML program for execution within at least one enclave, and executing the at least one tailored ML program within the at least one enclave. Tailoring the at least one ML program includes allocating a shared memory for computing a plurality of layers of a neural network, the shared memory reducing total memory usage during the computation of the plurality of layers, loading model parameter data for each of the plurality of layers onto the shared memory on-demand, addressing memory usage dependencies of the layers using inter-layer dependency resolution, and partitioning computation of any high memory usage layers into multiple sessions using intra-layer computation partitioning, the high memory usage layers including layers having a memory usage higher than a threshold memory usage.

According to another aspect of the present principles, a system is provided for efficient and scalable enclave protection for machine learning (ML) programs. The system includes a memory device having program code stored thereon and at least one processor device operatively coupled to the memory device. The at least one processor device is configured to execute program code stored on the memory device to tailor at least one ML program to generate at least one tailored ML program for execution within at least one enclave, and execute the at least one tailored ML program within the at least one enclave. The at least one processor device is configured to tailor the at least one ML program by allocating a shared memory for computing a plurality of layers of a neural network, the shared memory reducing total memory usage during the computation of the plurality of layers, loading model parameter data for each of the plurality of layers onto the shared memory on-demand, addressing memory usage dependencies of the layers using inter-layer dependency resolution, and partitioning computation of any high memory usage layers into multiple sessions using intra-layer computation partitioning, the high memory usage layers including layers having a memory usage higher than a threshold memory usage.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 7 is a diagram of a tailored ML program framework including a shared memory architecture, in accordance with an embodiment the present invention;

FIG. 8 is a diagram of a tailored ML program framework including on-demand loading, in accordance with an embodiment the present invention;

FIG. 9 is a diagram of a tailored ML program framework including inter-layer dependency resolution, in accordance with an embodiment the present invention;

FIG. 10 is a diagram of a tailored ML program framework including intra-layer computation partitioning, in accordance with an embodiment the present invention;

FIG. 13 is a diagram of a method for estimating a size of a shared memory region, in accordance with an embodiment of the present invention.

DETAILED DESCRIPTION OF PREFERRED EMBODIMENTS

Figure 1:
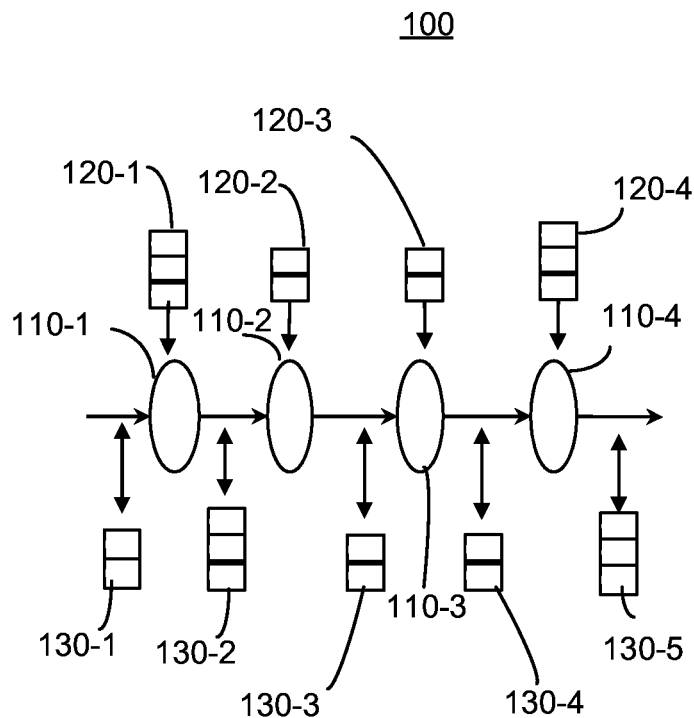
FIG. 1 is a diagram of a machine learning (ML) program framework, in accordance with an embodiment of the present invention.

To protect the confidentiality and integrity of sensitive data of programs while in use, the embodiments described herein utilize a trusted execution environment for operating secure containers in the form of hardware-protected memory regions, referred to as enclaves, for running computations on encrypted data without decryption on memory to protect security-sensitive code and data against untrusted entities that can include privileged and/or unprivileged programs. That is, an enclave described herein is a private execution memory region having contents that are protected and unable to be either read or saved by any process outside of the enclave itself, including processes running at higher privilege levels. An enclave can be defined by a set of security-related instruction codes (e.g., opcodes), which can allow user-level and/or operating system code to define the enclave. The set of security-related instruction codes can be built into a central processing unit (CPU). One example of a trusted execution environment providing an enclave is Intel® Software Guard Extensions (Intel® SGX).

Although enclaves can generally provide strong security in an untrusted computing environment, the usability of enclaves to run memory-intensive programs, such as, e.g., machine learning (ML) programs (e.g., deep learning (DL) programs) with large memory footprints can be limited due at least in part to the limited physical capacity of the physical memory region for storing encrypted enclave pages shared between all enclaves in the physical machine, referred to herein as Enclave Page Cache (EPC). However, since a part of the EPC can be pre-assigned for metadata (e.g., for integrity checking of enclave pages), the amount of available space for enclave programs in practice is less than the total size in practice. For example, if the EPC has a size of about 128 MB, the amount of available space for enclave programs can be about 93 MB or 23,936 pages.

The memory limit or memory budget of the EPC can undermine the performance of enclaves and can the ML program to run slower than in an unprotected environment (e.g., an order of magnitude slower). More specifically, when the memory size exceeds the memory limit or memory budget of the EPC, page swapping or secure paging between the EPC and unprotected memory can occur by evicting an old page from the EPC to the untrusted main memory and loading a new page into the EPC, resulting in a significant overhead to the ML execution. Page swapping can cost up to hundreds of thousands of cycles for each swapping, as it does not only include transitions to and from the enclave (causing translation lookaside buffer (TLB) flush), but also involves page encryption and integrity checks. Additionally, scalability problems may arise from many enclaves simultaneously competing to use the EPC, and when a ML program receives many simultaneous execution requests during a prediction phase. For example, in a product AI system with multiple enclaves that handle many prediction requests in parallel, the competition of the multiple enclaves in the physical machine causes low scalability by EPC thrashing, similar to thrashing of virtual memory.

To address at least the above-noted concerns regarding enclave protection frameworks, the embodiments described herein provide a framework that supports efficient and scalable enclave protection for running ML programs. To do this, the embodiments described herein can examine an ML model and generate a customized enclave or vessel for the ML model with optimized shared memory buffers. To overcome the memory limitation of the EPC, the embodiments described herein can focus on minimizing the peak memory usage of the ML program at run-time by leveraging the common and intrinsic characteristics of a ML program based on memory usage profiling of the ML program. Since no modification to the underlying ML model or semantics is needed to run the ML program within the customized enclave, the embodiments described herein minimize accuracy loss and other limitations to the functionality of the protected ML program. Accordingly, a balance between security and performance can be achieved.

More specifically, the embodiments described herein can design a customize enclave based on (1) shared memory planning; (2) on-demand parameter loading; and (3) EPC-aware job scheduling. Regarding the shared memory planning, during ML learning computation, a shared memory buffer can be provided that allows memory buffers to be shared across different layers or sublayers to reduce the memory footprint and improve the reusability of the memory. Regarding on-demand parameter loading, bulk allocation of large memory buffers for model parameters can be eliminated by retrieving them in an on-demand fashion into the shared memory buffer. Regarding EPC-aware job scheduling, the embodiments described herein can improve scalability by precomputing the size of the peak memory required for each enclave, and scheduling jobs into processors only when estimated total memory usage of the enclaves at run-time will not cause EPC thrashing or page swapping by exceeding the memory budget (e.g., about 128 MB). The memory-budget-aware enclave scheduling described herein can provide the high throughput (regardless of the number of enclaves) while overcoming the scalability limitations of the underlying trusted execution environment and scalable processing of many parallel ML prediction requests without causing EPC thrashing can be achieved.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a diagram is provided illustrating a machine learning (ML) network 100 of a ML prediction phase performed in response to receiving a prediction query. In one embodiment, the ML network 100 includes a deep learning (DL) network. Deep learning refers to a family of machine learning methods whose models are based on artificial neural networks (ANNs), which use multiple layers to extract higher level features in a progressive manner. Each layer is responsible for transforming input data into a slightly more abstract representation. As the computation proceeds and goes deeper, complex functions can be learned and feature representations can be extracted (e.g., object edges for image classification). A DL model can include hyperparameters and model parameters. During the development of the ANN, the hyperparameters can be manually determined and fine-tuned to represent network structure, such as the types of layers and edges that connect neurons in different layers. The model parameters, which can include weights on the edges, can be learned automatically during training based on training data and a loss function. After deployment, the DL program takes the learned model and produces a prediction outcome given input data (e.g., the class of an input image for image classification).

More specifically, as shown, the network 100 includes an ANN including a plurality of layers, with each of the layers connected to an output of a previous layer becoming the input of a subsequent layer. Unlike ML training, ML prediction generally works in the forward direction only, and is performed in a sequence and layer-by-layer manner. Thus, the network 100 can be a feed-forward ANN.

The plurality of layers include layers 110-1 through 110-4. Although not explicitly shown in FIG. 1, there can be N total layers. The network 100 can be configured to receive image data as input, and output a classification result based on the image data. In general, each of the layers 110-1, 110-2, 110-3 and 110-4 can perform its own computations vis-à-vis per-layer operations using a bound set of resources (e.g., input/output (I/O) data and model parameters) with pre-defined dependencies among different ones of the layers 110-1, 110-2, 110-3 and 110-4. Accordingly, the layers 110-1, 110-2, 110-3 and 110-4 may be sequentially computed from the front layer 110-1 to the back layer 110-4.

During DL prediction, each of the plurality of layers takes data as input. For example, the data can include model parameter data and I/O data that can be written to buffers. The model parameter data can include weight data learned during training. More specifically, the layer 110-1 takes model parameter data 120-1 and I/O data 130-1, the layer 110-2 takes model parameter data 120-2 and I/O data 130-2, the layer 110-3 takes model parameter data 120-3 and I/O data 130-3, and the layer 110-4 takes model parameter data 120-4 and I/O data 130-4. Additional I/O data 130-5 can be provided in conjunction with the output of the layer 110-4.

One feature of DL prediction is that the size of memory needed to run each layer can be calculated ahead of the execution through a target parameter or architecture, which generally includes the metadata of the trained model (e.g., layer numbers and types). A typical workflow of a per-layer operation is as follows: (1) Given an input vector, dot-product operations are performed with a corresponding parameter and (2) a final layer output can be yielded by performing follow-up computations (e.g., bias addition and activation) on the intermediate result. Among two consecutive layers, there can be a dependency of output data in that data generated by a current layer is used in the subsequent layer as an input source. In contrast, everything else (e.g., the model parameter data) is independent from each other.

Figure 2:
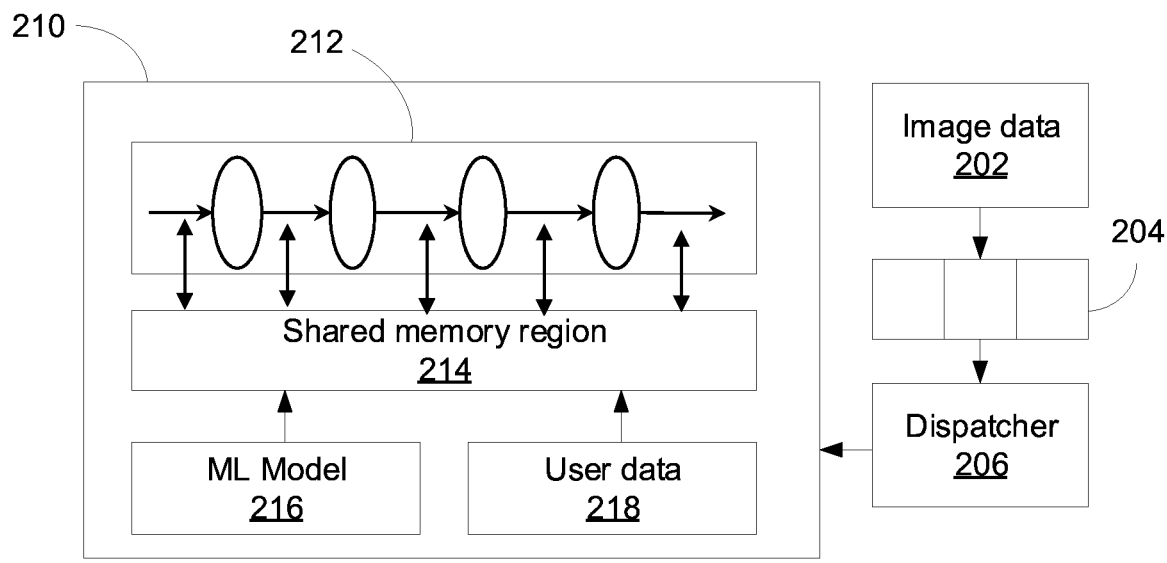
FIG. 2 is a diagram of an overview of a system for efficient and scalable enclave protection, in accordance with an embodiment of the present invention.

With reference to FIG. 2, a diagram is provided illustrating an overview of a system 200 for efficient and scalable enclave protection. In this illustrative embodiment, the system 200 can perform machine learning (ML) prediction of image data.

As shown, the system 200 includes image data 202, request queue 204, dispatcher 206 and enclave 210. More specifically, the enclave 210 includes a plurality of layers 212 in communication with a shared memory region 214, a machine learning (ML) model 216 and user data 218. The system can receive a request to perform ML prediction on the image data 202, which gets placed into the request queue 204. The dispatcher 206 can then schedule the job to be performed within the enclave 210. More specifically, the system 200 can perform shared memory usage planning with the shared memory region 214, on-demand loading of data from the ML model 216 and/or user data 218, and memory budget aware scheduling using the dispatcher 206. This can enable the system 200 to perform efficient and scalable enclave protection. Further details regarding the system 200 are described below with reference to FIG. 3.

Figure 3:
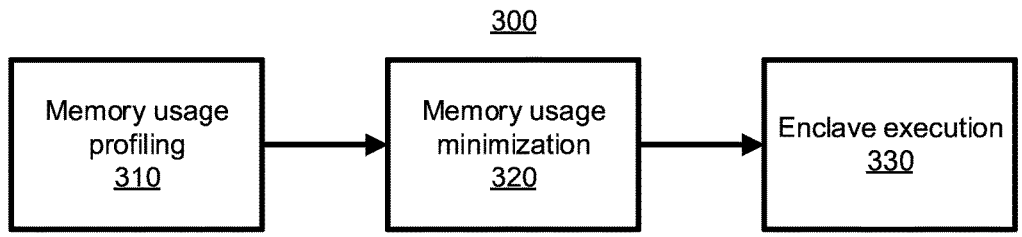
FIG. 3 is a block/flow diagram of a high-level system/method for efficient and scalable enclave protection for machine learning (ML) programs, in accordance with an embodiment of the present invention.

With reference to FIG. 3, a block/flow diagram is provided illustrating a high-level overview of a system/method 300 for implementing efficient and scalable enclave protection for machine learning (ML) programs. More specifically, the system/method 300 provides a ML framework that minimizes memory footprints of enclaves for highly efficient and scalable ML program execution under enclave protection.

The system/method 300 can include a plurality of components, including a memory usage profiling component 310, a memory usage minimization component 320, and an enclave execution component 330. One or more of the components 310 through 230 can include functionality for implementing efficient and scalable enclave protection.

The memory usage profiling component 310 is configured to generate memory profile results for a plurality of machine learning (ML) programs. The memory profile results can include memory allocation and memory usage patterns of the ML programs. In one embodiment, the ML programs include one or more deep learning (DL) programs. The goal of memory usage profiling is to find opportunities to reduce memory usage of ML programs based on their common program behavior patterns. Further details regarding the memory usage profiling component 310 are described below with reference to FIG. 4.

The memory usage minimization component 320 is configured to minimize memory usage of the ML programs based on the memory profile results to generate a plurality of tailored ML programs. Further details regarding the memory usage minimization component 320 are described below with reference to FIG. 5.

The enclave execution component 330 is configured to run the tailored ML programs within respective enclaves. The enclaves provide confidentiality protection, thereby allowing the tailored ML programs to run safely within their respective enclaves. In one embodiment, the enclaves include Intel® SGX enclaves. However, such an embodiment should not be considered limiting. Further details regarding the enclave execution component 330 are described below with reference to FIG. 6.

During run-time, the tailored ML programs may each have a very small memory footprint (e.g., between about 74% to about 88% smaller than non-tailored ML programs) and the enclaves may be scheduled into the processors such that their memory usage will not exceed the memory limit of the trusted execution environment (e.g., about 128 MB), resulting in confidential ML programs with high efficiency and scalability (e.g., between about 5 times to 21 times more efficient than non-tailored ML programs).

Figure 4:
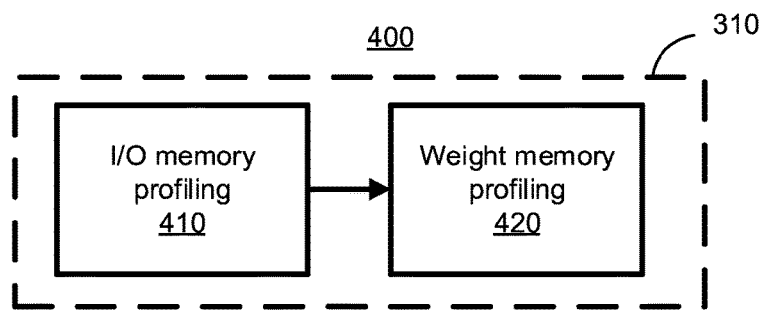
FIG. 4 is a block/flow diagram of a system/method for implementing a memory usage profiling component within the system/method of FIG. 3, in accordance with an embodiment the present invention.

With reference to FIG. 4, a block/flow diagram is provided illustrating a system/method 400 for generating memory profile results for a machine learning (ML) program. The goal of the system/method 400 is to find opportunities to reduce the memory usage of ML programs based on common behavior patterns.

The memory usage can be profiled by running dynamic program analyses (using Valgrind and a modified Intel SGX driver) on the execution of popular machine learning programs. The dynamic program analyses can be performed using a memory profiling tool (e.g., Valgrind). In the embodiment in which the trusted execution environment is Intel® SGX, the dynamic program analyses can be performed using the memory profiling tool and a modified Intel® SGX driver. The allocations and deallocations of memory buffers and the execution of program code that accesses those buffers are monitored by the analyses.

To achieve this goal, as shown, a memory usage profiling component 310 can include a plurality of subcomponents, including an input and output (I/O) memory profiling subcomponent 410 and a weight memory profiling subcomponent 420.

The I/O memory profiling subcomponent 410 is configured to perform I/O memory profiling by analyzing how ML programs use I/O memory buffers (e.g., the I/O memory buffers described above with reference to FIG. 2). As a result of this profiling, it can be shown that ML programs allocate the memory buffers of all layers at once at the beginning of the program execution during the initialization phase (e.g., the memory allocation described above with reference to FIG. 2) and de-allocate the memory buffers when the ML program terminates after all of the layers are computed. The memory usage of an ML program can reach its peak early at the beginning and the ML program can keep the maximum memory allocation throughout its lifetime. This may be problematic under enclave protection because the high memory usage inside the enclave can cause the expensive page swapping. For example, although the memory buffers are allocated for a long time, the memory buffers are used for only a short period of time. More specifically, because of the nature of the layered ML program execution, each layer uses a certain set of I/O buffers and all other layers do not use them. Such redundancy in memory allocation results in a high number of enclave page swapping and therefore a large performance overhead.

The weight memory profiling subcomponent 420 is configured to perform weight memory profiling by analyzing how ML programs use weight memory buffers (e.g., the weight memory buffers described above with reference to FIG. 2). As a result of this profiling, it can be shown that the weight buffers of all layers can be allocated at the beginning of the program execution and de-allocated when the ML program terminates after all of the layers are computed. Unlike input and output buffers, weight buffers are loaded with weight data in a model file. The weight data can be produced during training and a specific set of weights may be assigned to certain layer. After the weight buffers are allocated, the ML program can read the weights from the model file and store the weights from the model file into the corresponding layers during the ML program initialization. Similar to the I/O buffers, each layer only uses the set of weights assigned to it only during its execution. Compared to the total program execution period, this period is very small and thus these weights unnecessarily consume memory for most of the lifetime of the ML program. Similar to the I/O memory usage, this redundant usage of weight memory results in a performance overhead inside the enclave. For example, execution time with enclave protection can be between, e.g., about 4 time to about 23 times that of unprotected execution.

Figure 5:
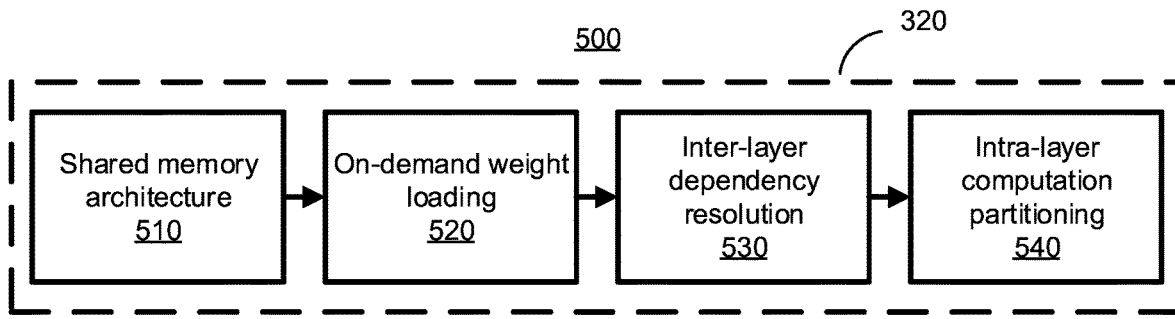
FIG. 5 is a block/flow diagram of a system/method for implementing a memory usage minimization component within the system/method of FIG. 3, in accordance with an embodiment the present invention.

With reference to FIG. 5, a block/flow diagram is provided illustrating a system/method 500 for minimizing memory usage based on the memory profile results. The goal of the system/method 500 is to tailor ML programs to minimize memory usage.

As shown, a memory usage minimization component 320 can include a plurality of subcomponents, including a shared memory architecture subcomponent 510, an on-demand weight loading subcomponent 520, an inter-layer dependency resolution subcomponent 530, and an intra-layer computation partitioning subcomponent 540.

The shared memory architecture subcomponent 510 is configured to tailor the ML program to use a shared memory for the computation of all individual layers of the NN framework. Since the layers in a ML program framework are generally independent and may be computed in a sequence one by one, the shared memory can reduce the total memory usage of computation of the layers of the ML program significantly. That is, the ML program can be tailored to allocate a single memory at the beginning of ML program execution, as opposed to separate weight and I/O buffer allocation for each layer (as described above with reference to FIG. 2). Further details regarding the shared memory architecture subcomponent 510 are described below with reference to FIG. 7.

The on-demand weight loading subcomponent 520 is configured to optimize the behavior of the ML program of loading weights from the model file. Further details regarding the on-demand weight loading subcomponent 520 are described below with reference to FIG. 8.

The inter-layer dependency resolution subcomponent 530 is configured to address memory usage dependencies between different layers when. Further details regarding the inter-layer dependency resolution subcomponent 530 are described below with reference to FIG. 9.

The intra-layer computation partitioning subcomponent 540 is configured to partition the computation of layers with high memory usage into multiple sessions. To identify those layers with high memory usage, the memory usage of each layer can be compared to a threshold memory usage.

For example, if the EPC has a memory size of about 128 MB, the threshold memory usage can be set to about 93 MB to exhaustively use the memory size of the EPC with one enclave without causing thrashing. Thus, if running two enclaves in parallel is desired, then the threshold memory usage for each of the two enclaves can be about 46.5 MB. The threshold memory usage can be experimentally determined based on desired performance of each enclave to run in the computing device.

Further details regarding the intra-layer computation partitioning subcomponent 540 are described below with reference to FIG. 10.

Each of the techniques performed by the subcomponents 510-540 can reduce the memory usage of computation of the layers of the ML program. For example, expensive page swapping of the enclave can be reduced or eliminated.

Figure 6:
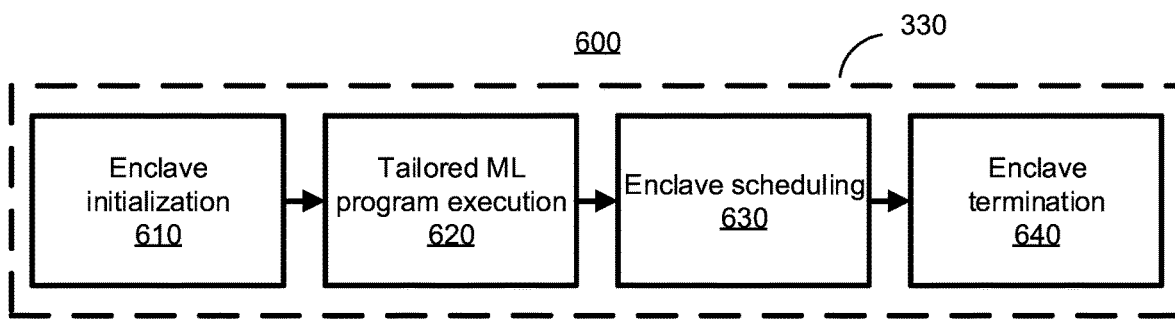
FIG. 6 is a block/flow diagram of a system/method for implementing an enclave execution component within the system/method of FIG. 3, in accordance with an embodiment the present invention.

With reference to FIG. 6, a block/flow diagram is provided illustrating a system/method 600 for executing a tailored ML program within an enclave. The goal of the system/method 600 is to confidentially and efficiently execute tailored ML programs with high scalability.

As shown, an enclave execution component 330 can include a plurality of subcomponents, including an enclave initialization subcomponent 610, a tailored ML program execution subcomponent 620, an enclave scheduling subcomponent 630, and an enclave termination subcomponent 640.

The enclave initialization subcomponent 610 is configured to, for each tailored ML program, launch and initialize an enclave.

The tailored ML program execution subcomponent 620 is configured to execute the tailored ML program inside each enclave. More specifically, the tailored ML program inside each enclave allocates the shared memory. As the layers are computed in a sequence, the corresponding weights for the layer to be executed can be loaded on-demand, an allocation of extra shared memory can be adjusted (e.g., allocated and/or de-allocated) for additional dependencies, and the partitioned computation of layers with large memory consumption is executed efficiently using the shared memory.

The enclave scheduling subcomponent 630 is configured to schedule multiple ones of the enclaves into processors. The scheduling is based at least in part on the memory budget shared by all of the enclaves (e.g., 128 MB memory budget). Since the size of the data memory required to run each enclave can be calculated before the execution, it is feasible to predict the total memory consumption of all enclaves before launching a new enclave. Thus, the enclave scheduling subcomponent 630 can receive ML program execution requests from users and schedule the launching of the enclaves into the processors to achieve the best-effort throughput by avoiding the expensive page swapping. Such a central enclave scheduler is needed because the process scheduler of the underlying operating system (OS) is unaware of the memory budget, and thus having the OS process scheduler blindly launch the enclaves upon requests simultaneously can cause a situation where all enclaves compete for the small memory budget (resulting in a lot of enclave page swapping and overhead).

More specifically, when a new ML program execution is requested, the enclave scheduling subcomponent 630 checks if launching a new enclave will cause page swapping using the pre-calculated memory requirement. If launching the new enclave is expected to cause page swapping, the enclave scheduling subcomponent 630 waits for the currently running enclaves to terminate until enough memory space becomes available for the new enclave. The new enclave is scheduled into a processor whenever the memory can accommodate it without causing page swapping. Accordingly, the enclave scheduling subcomponent 630 produces the best-effort throughput for all ML execution requests and keeps the scalability high.

The enclave termination subcomponent 640 is configured to terminate the enclaves. The enclaves can be terminated safely based on an enclave termination procedure in response to the confidential computation being finished.

With reference to FIG. 7, a diagram is provided illustrating a shared memory architecture framework in accordance with an embodiment. Similar to the framework 200 of FIG. 2, the ML prediction operates based on an artificial neural network (ANN) (e.g., a feed-forward ANN). More specifically, the framework 700 can include a plurality of layers including layers 710-1, 710-2, 710-3, 710-4 . . . 710-N. Each of the layers can be connected to an output of a previous layer becoming the input of a subsequent layer. In general, the layers 710-1 through 710-N are each independently computed on separate sets of data with pre-defined dependencies among different ones of the layers 710-1 through 710-N. The layers 710-1 through 710-N may be sequentially computed from the front layer 710-1 to the back layer 710-N.

As previously mentioned, inefficient memory management can cause significant slowdown when running in an enclave. To make memory management more efficient, the framework 700 further includes a shared memory region 720 storing model parameter data (e.g., weight data) and I/O data for the layers 710-1 through 710-N. The shared memory region 720 maintains a fixed minimum chunk of memory in a secure container, making the layers 710-1 through 710-N share the shared memory region 720 while performing layer-based computations. Such a shared memory region 720 can support all the per-layer storage and computations without requiring follow-up memory allocations and deallocations.

In the forward direction, each layer 710-1 through 710-N can fully occupy the shared memory region 720 while processing its own computations. Once used, the occupied space, except for the output buffer, can be immediately voided such that the following layer is able to reuse this space afterward. Taking advantage of such temporal locality in this respect, the shared memory region 720 could be pinned in an EPC region throughout execution, with no more performance penalty caused by extra memory (de)allocation.

At a high level, the following two-staged workflow can be performed: (1) offline profiling and (2) on-line deployment. During offline profiling, a target hyperparameter can be profiled and an optimized size of the shared memory region 720 at initialization can be estimated. The size of the shared memory region 720 corresponds to a size of the memory needed by the layer with the maximum memory usage across all the layers 710-1 through 710-N. This size can be pre-calculated before the ML program execution because the ANN architecture of the ML program can be specified as program input. A minimum space possible for the shared memory region 720 should be maintained. To pre-calculate and optimize its upper limit, the hyperparameter can be leveraged by walking through all operations and keeping track of the amount of memory buffers needed in every layer 710-1 through 710-N. An example of a method that can be used to estimate the size of the shared memory region 720 is described with reference to FIG. 13. Given the estimation of the size of the shared memory region 720, a customized enclave can be launched in accordance with the embodiments described herein.

With reference to FIG. 8, a diagram is provided illustrating an on-demand loading framework 800 in accordance with an embodiment. Similar to the frameworks 200 and 700 of FIGS. 2 and 7, respectively, the ML program operates based on an artificial neural network (ANN). In one embodiment, the ANN includes a feed-forward ANN.

More specifically, the framework 800 can include a plurality of layers including layers 810-1, 810-2, 810-3 and 810-4. Each of the layers can be connected to an output of a previous layer becoming the input of a subsequent layer. Although not explicitly shown in FIG. 8, there can be N total layers. In general, the layers 810-1 through 810-4 are each independently computed on separate sets of data with pre-defined dependencies among different ones of the layers 810-1 through 810-4. The layers 810-1 through 810-4 may be sequentially computed from the front layer 810-1 to the back layer 810-4. The framework 800 further includes a shared memory 820 and a model file 830 having models 832-1 through 832-4 each including corresponding model parameter data.

During the initialization, a ML program generally reads the model file 830 and loads model parameter data (e.g., weight data) from the models 832-1 through 832-4 into the buffers of the all layers 810-1 through 810-4 all at once in a bulk allocation regardless of usage. However, in order to utilize the shared memory 820 for model parameter data, the framework 800 loads model parameters from the models 832-1 through 832-4 for each of the layers 810-1 through 810-4 on-demand. More specifically, instead of loading the model parameter data for all the layers at once, only model parameter data that is necessary is loaded into the shared memory 820 before computing a current layer. When the next layer is computed, the new corresponding model parameter data for the layer can be loaded into the shared memory 820 and the old model parameter data will be overwritten. As shown in this example, the model parameter data from model 830-3 are loaded into the shared memory on-demand before computing layer 810-3.

With reference to FIG. 9, a diagram is provided illustrating an inter-layer dependency resolution framework 900 including in accordance with an embodiment. Similar to the frameworks 200, 700 and 800 of FIGS. 2, 7 and 8, respectively, the ML program operates based on an artificial neural network (ANN). In one embodiment, the ANN includes a feed-forward ANN.

More specifically, the framework 900 can include a plurality of layers including layers 910-1, 910-2, 910-3 and 910-4. Each of the layers can be connected to an output of a previous layer becoming the input of a subsequent layer. Although not explicitly shown in FIG. 9, there can be N total layers. In general, the layers 910-1 through 910-4 are each independently computed on separate sets of data with pre-defined dependencies among different ones of the layers 910-1 through 910-4. The layers 910-1 through 910-4 may be sequentially computed from the front layer 910-1 to the back layer 910-4. The framework 900 further includes a shared memory region 920 and I/O data 930. In this example, the I/O data 930 is being combined with the output of the layer 910-1 as input into the layer 920-2, and a dependency relationship exists between the layer 910-3 and the I/O data 930 (as indicated by the dashed line).

Although not very common, some layers take input from layers other than the immediately preceding layer. For example, a "shortcut" layer may take inputs from both the immediately preceding layer and another designated layer. Such a dependency could be a challenge because at the point of reuse, the referred output may not be available because the shared memory region 920 is already occupied by another layer. To handle this, the shared memory region 920 can be maintained separately in the enclave. Right after its reuse, the allocated buffer can be removed from enclave memory to ensure that memory space resides in the enclave for the shortest lifetime, thereby having a minimum impact on overall memory footprints. The framework 900 leverages inter-layer dependencies and allocates the shared memory 920 specifically for such input data. This special shared memory 920 is allocated when the I/O data 930 is produced and de-allocated as soon as the ML program no longer needs the data. The allocation and de-allocation of such shared memory 920 can be decided before the ML program execution.

With reference to FIG. 10, a diagram is provided illustrating an intra-layer computation partitioning framework 1000 in accordance with an embodiment. Similar to the frameworks 200, 700, 800 and 900 of FIGS. 2, 7, 8 and 9, respectively, the ML program operates based on an artificial neural network (ANN). In one embodiment, the ANN includes a feed-forward ANN. More specifically, the framework 1000 can include a plurality of layers including layer 1010. For example, the layer 1010 can be a third layer of the plurality of layers. Each of the layers can be connected to an output of a previous layer becoming the input of a subsequent layer. Although not explicitly shown in FIG. 10, there can be N total layers. In general, the plurality of layers including layer 1010 are each independently computed on separate sets of data with pre-defined dependencies among different ones of the layers. The layers may be sequentially computed from the front layer to the back layer.

The framework 1000 further includes a shared memory region 1020. Moreover, for every layer that consumes more memory than a threshold (e.g., layer 1010 shown in FIG. 10), the framework 1000 tailors the ML program to partition a set of model parameter data into model parameter data subsets 1030-1 and 1030-2. In a ML program, some layers may consume excessively large memory (which can be significantly more than other layers), thereby resulting in a large shared memory. Such a large shared memory is waste of the memory space for small layers. To address this problem, the framework 1000 partitions the computation of a large layer 1010 into multiple sessions 1040-1 and 1040-2 based on the subsets 1030-1 and 1030-2. For example, a layer computation can be a dot product operation which repeatedly multiplies an input vector with a weight and produces an output vector. Such a dot product operation can be partitioned into multiple sessions 1040-1 and 1040-2 such that each session computes only with a respective one of the subsets 1030-1 and 1030-2. As a result, the size of the shared memory region 1020 can be kept small and the utilization of the space of the shared memory region 1020 can be high throughout the ML program execution.

Although the frameworks in FIGS. 7-10 are shown as individual frameworks, the frameworks in FIGS. 7-10 can be combined in a single framework for efficient and scalable enclave protection.

Figure 11:
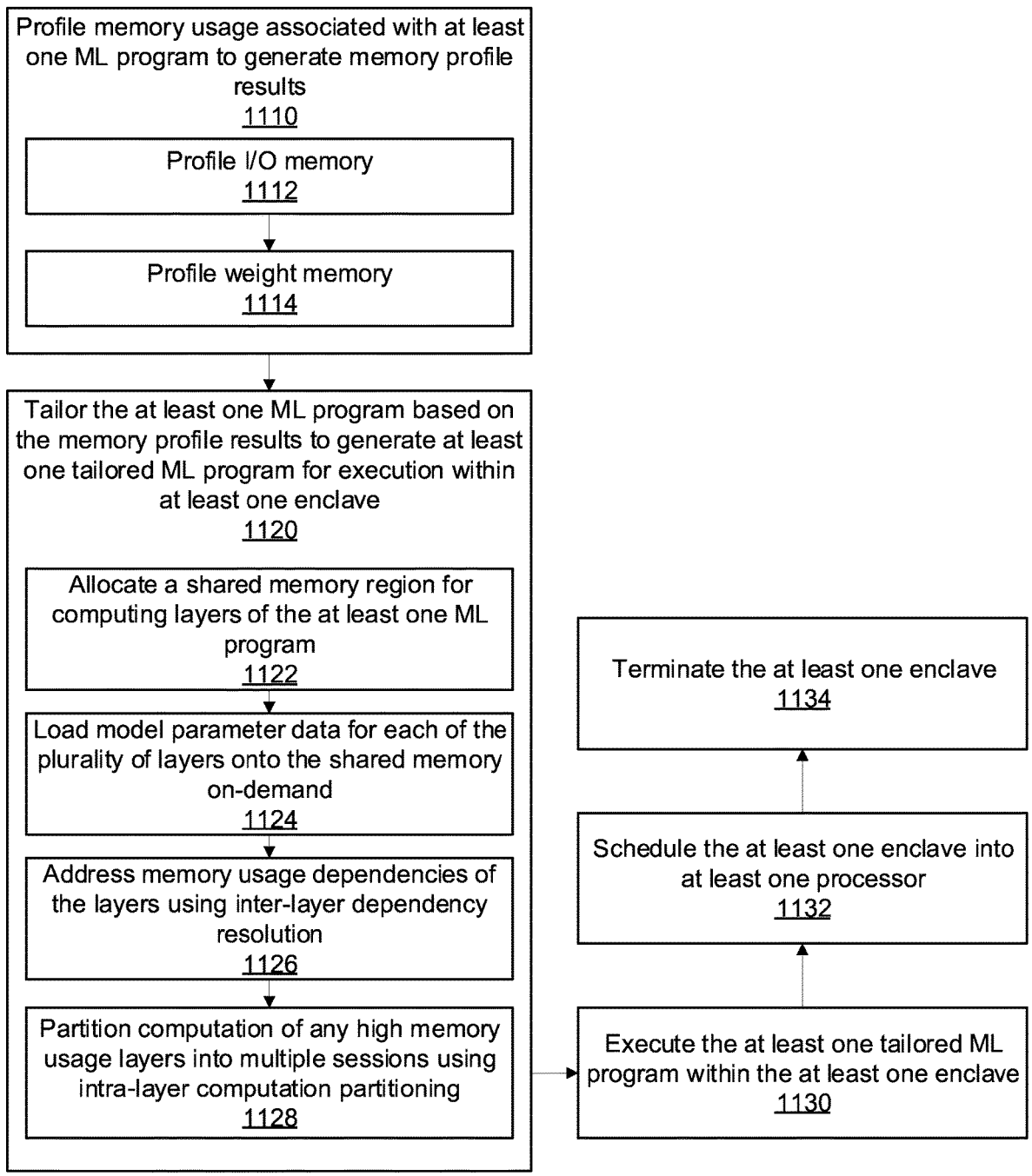
FIG. 11 is a block/flow diagram of a system/method for implementing efficient and scalable enclave protection for ML programs, in accordance with an embodiment of the present invention.

With reference to FIG. 11, a block/flow diagram is provided illustrating a system/method 1100 for implementing efficient and scalable enclave protection for machine learning (ML) programs.

At block 1110, memory usage associated at least one ML program is profiled to generate memory profile results. The at least one ML program can include ML prediction. The at least one ML program can be part of a plurality of ML programs that will be run in a plurality of respective enclaves. In one embodiment, the at least one ML program includes at least one deep learning (DL) program. The goal of memory usage profiling is to find opportunities to reduce memory usage based on common program behavior patterns. The memory profile results can include memory allocation and memory usage patterns of the ML programs.

The ML prediction can be implemented using an artificial neural network (NN) framework (e.g., a feed-forward NN framework). More specifically, the ANN can include a plurality of layers having corresponding inputs and outputs. Model parameter data and input/output (I/O) data can be assigned to respective ones of the plurality of layers.

Profiling the memory usage to generate the profile results can include, at block 1112, profiling input/output (I/O) memory and, at block 1114, profiling weight memory. Profiling the I/O memory can include analyzing how the at least one ML program uses I/O memory buffers, and profiling the weight memory can include analyzing how the at least one ML program uses weight memory buffers.

Further details regarding blocks 1110-1114 are described above with reference to FIGS. 2-4.

At block 1120, the at least one ML program is tailored based on the memory profile results to generate at least one tailored ML program for execution within at least one enclave. The tailoring is performed to minimize memory usage of the at least one ML program while being executed in an enclave. For example, expensive page swapping of the enclave can be reduced to eliminated.

Tailoring the at least one ML program to generate the at least one tailored ML program can include, at block 1122, allocating a shared memory for computing layers of the at least one ML program. That is, the at least one ML program can be tailored to allocate a single memory at the beginning of ML program execution, as opposed to separate weight and I/O buffer allocations for each layer. Since the layers in a ML program framework are generally independent and may be computed in a sequence one by one, the shared memory can reduce the total memory usage during computation of layers of the at least one ML program significantly.

Tailoring the at least one ML program to generate the at least one tailored ML program can further include, at block 1124, loading model parameter data for each of the plurality of layers onto the shared memory on-demand. The model parameter data can include weights loaded from at least one model file associated with the at least one ML program. The on-demand loading of the mode parameters can optimize the behavior of the at least one ML program.

Tailoring the at least one ML program to generate the at least one tailored ML program can further include, at block 1126, addressing memory usage dependencies of the layers using inter-layer dependency resolution.

Tailoring the at least one ML program to generate the at least one tailored ML program can further include, at block 1128, partitioning computation of any high memory usage layers into multiple sessions using intra-layer computation partitioning. More specifically, since some layers may consume excessively large memory, those layers having high memory usage can be partitioned into multiple sessions to minimize a size of the shared memory and keep utilization of the space of the shared memory high through execution of the at least one ML program. To identify high memory usage layers, the memory usage of each layer can be compared to a threshold memory usage. For example, if the EPC has a memory size of about 128 MB, the threshold memory usage can be set to about 93 MB to exhaustively use the memory size of the EPC with one enclave without causing thrashing. Thus, if running two enclaves in parallel is desired, then the threshold memory usage for each of the two enclaves can be about 46.5 MB. The threshold memory usage can be experimentally determined based on desired performance of each enclave to run in the computing device.

For example, a layer computation can be a dot product operation which repeatedly multiplies an input vector with a weight and produces an output vector. Such a dot product operation can be partitioned into multiple sessions such that each session computes only with a respective weight subset.

Further details regarding blocks 1120-1128 are described above with reference to FIGS. 3, 5 and 7-10.

At block 1130, the at least one tailored ML program is executed within the at least one enclave. The at least one enclave can be at least one new enclave, where one or more additional enclaves currently exists. The at least one enclave provides confidentiality protection, thereby allowing the at least one tailored ML program to run safely within the at least one enclave. In one embodiment, the at least one enclave includes at least one Intel® SGX enclave. Accordingly, the goal of executing the at least one tailored ML program within the at least one enclave is to confidentially and efficiently execute the at least one tailored ML program with high scalability.

More specifically, the at least one tailored ML program within the at least one enclave allocates the shared memory. As the layers are computed in a sequence, the corresponding model parameter data for the layer to be executed can be loaded on-demand, an allocation of extra shared memory can be adjusted (e.g., allocated and/or de-allocated) for additional dependencies, and the partitioned computation of layers with large memory consumption can be executed using the shared memory based on the computation, the adjustment, and any partitioned computations. Executing the at least one tailored ML program can further include initializing the at least one enclave.

At block 1132, the at least one enclave is scheduled into at least one processor. The scheduling is performed so that the memory usage does not exceed a memory budget of the underlying trust processed processor technology (e.g., the memory budget can be e.g., about 128 MB). Since the size of the data memory required to run the at least one enclave can be calculated before the execution, it is feasible to predict the total memory consumption before launching a new enclave. Thus, the launching of the at least one enclave into at least one processor can be scheduled based on at least one execution request to achieve the best-effort throughput by avoiding page swapping. Accordingly, the at least one enclave is scheduled into the at least one processor whenever the memory budget can accommodate the at least one enclave without causing page swapping.

For example, scheduling the at least one enclave into the at least one processor can include, in response to receiving a new ML program execution request, determining that launching the at least one enclave will cause page swapping using a pre-calculated memory requirement. If launching the new enclave is expected to cause page swapping, the at least one enclave will be scheduled into the at least one processor by waiting for any currently running enclaves to terminate until enough memory space becomes available for the at least one enclave. Accordingly, the enclave scheduling subcomponent produces the best-effort throughput for all ML execution requests and keeps the scalability high.

At block 1134, the at least one enclave is terminated. The at least one enclave can be terminated safely based on an enclave termination procedure in response to the confidential computation being finished.

Further details regarding blocks 1130-1136 are described above with reference to FIGS. 3 and 6.

Figure 12:
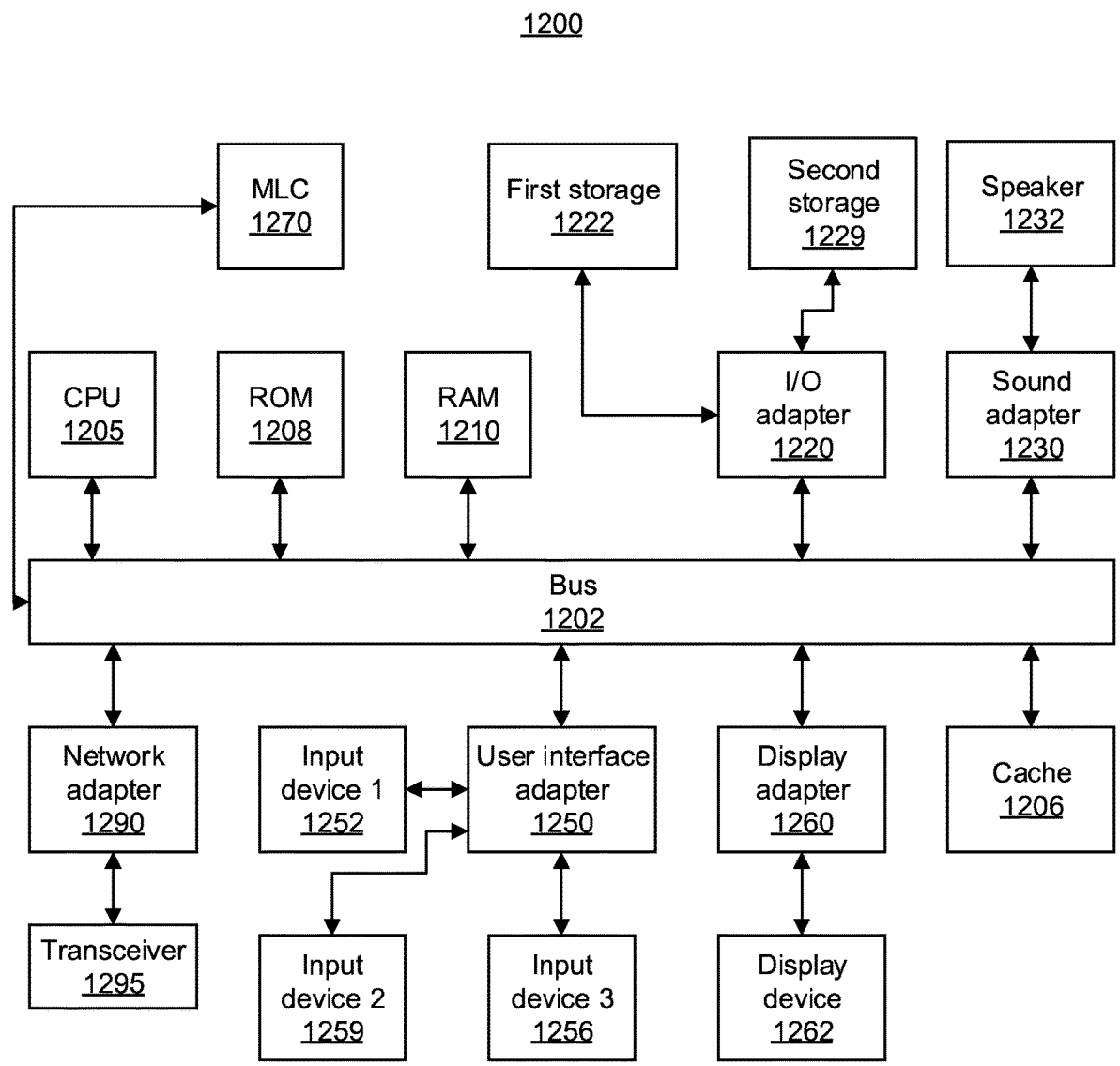
FIG. 12 is a block/flow diagram of a computer system, in accordance with an embodiment the present invention.

Referring now to FIG. 12, an exemplary computer system 1200 is shown which may represent a server or a network device, in accordance with an embodiment of the present invention. The computer system 1200 includes at least one processor (CPU) 1205 operatively coupled to other components via a system bus 1202. A cache 1206, a Read Only Memory (ROM) 1208, a Random-Access Memory (RAM) 1210, an input/output (I/O) adapter 1220, a sound adapter 1230, a network adapter 1290, a user interface adapter 1250, and a display adapter 1260, are operatively coupled to the system bus 1202.

A first storage device 1222 and a second storage device 1229 are operatively coupled to system bus 1202 by the I/O adapter 1220. The storage devices 1222 and 1229 can be any of a disk storage device (e.g., a magnetic or optical disk storage device), a solid state magnetic device, and so forth. The storage devices 1222 and 1229 can be the same type of storage device or different types of storage devices.

A speaker 1232 may be operatively coupled to system bus 1202 by the sound adapter 1230. A transceiver 1295 is operatively coupled to system bus 1202 by network adapter 1290. A display device 1262 is operatively coupled to system bus 1202 by display adapter 1260.

A first user input device 1252, a second user input device 1259, and a third user input device 1256 are operatively coupled to system bus 1202 by user interface adapter 1250. The user input devices 1252, 1259, and 1256 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 1252, 1259, and 1256 can be the same type of user input device or different types of user input devices. The user input devices 1252, 1259, and 1256 are used to input and output information to and from system 1200.

Machine learning confidentiality (MLC) component 1270 may be operatively coupled to system bus 1202. MLC component 1270 is configured to perform one or more of the operations described above. MLC component 1270 can be implemented as a standalone special purpose hardware device, or may be implemented as software stored on a storage device. In the embodiment in which MLC component 1270 is software-implemented, although shown as a separate component of the computer system 1200, MLC component 1270 can be stored on, e.g., the first storage device 1222 and/or the second storage device 1229. Alternatively, MLC component 1270 can be stored on a separate storage device (not shown).

Of course, the computer system 1200 may also include other elements (not shown), as readily contemplated by one of skill in the art, as well as omit certain elements. For example, various other input devices and/or output devices can be included in computer system 1200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 1200 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for efficient and scalable enclave protection for machine learning (ML) programs, comprising:
   tailoring at least one ML program to generate at least one tailored ML program for execution within at least one enclave, including:
      allocating a shared memory for computing a plurality of layers of a neural network, the shared memory reducing total memory usage during the computation of the plurality of layers;
      loading model parameter data for each of the plurality of layers onto the shared memory on-demand;
      addressing memory usage dependencies of the layers using inter-layer dependency resolution; and
      partitioning computation of any high memory usage layers into multiple sessions using intra-layer computation partitioning, the high memory usage layers including layers having a memory usage higher than a threshold memory usage for the at least one enclave; and
   executing the at least one tailored ML program within the at least one enclave, the executing the at least one tailored ML program within the at least one enclave comprising:
      computing the plurality of layers in a sequence using the shared memory, including loading weights for each layer to be executed on-demand;
      adjusting an allocation of extra shared memory for additional dependencies; and
      executing the at least one tailored ML program using the shared memory based on the computation, adjustment and any partitioned computations.

2. The method of claim 1, further comprising profiling memory usage to generate memory profile results for tailoring the at least one ML program, including:
   profiling I/O memory by analyzing how the at least one ML program uses I/O memory buffers; and
   profiling weight memory by analyzing how the at least one ML program uses weight memory buffers.

3. The method of claim 1, wherein the model parameter data is loaded from at least one model file associated with the at least one ML program.

4. The method of claim 1, further comprising scheduling the at least one enclave into at least one processor such that memory usage does not exceed a memory budget.

5. The method of claim 4, wherein scheduling the at least one enclave further includes:

receiving a new ML program execution request;
determining that launching the at least one enclave will cause page swapping using a pre-calculated memory requirement; and
scheduling the at least one enclave into the at least one processor by waiting until enough memory space becomes available for the at least one enclave.

6. The method of claim 1, further comprising terminating the at least one enclave.

7. A computer program product comprising a non-transitory computer readable storage medium having program instructions embodied therewith, the program instructions executable by a computer to cause the computer to perform a method for efficient and scalable enclave protection for machine learning (ML) programs, the method performed by the computer comprising:
    tailoring at least one ML program to generate at least one tailored ML program for execution within at least one enclave, including:
        allocating a shared memory for computing a plurality of layers of a neural network, the shared memory reducing total memory usage during the computation of the plurality of layers;
        loading model parameter data for each of the plurality of layers onto the shared memory on-demand;
        addressing memory usage dependencies of the layers using inter-layer dependency resolution; and
        partitioning computation of any high memory usage layers into multiple sessions using intra-layer computation partitioning, the high memory usage layers including layers having a memory usage higher than a threshold memory usage for the at least one enclave; and
    executing the at least one tailored ML program within the at least one enclave, the executing the at least one tailored ML program within the at least one enclave comprising:
        computing the plurality of layers in a sequence using the shared memory, including loading weights for each layer to be executed on-demand;
        adjusting an allocation of extra shared memory for additional dependencies; and
        executing the at least one tailored ML program using the shared memory based on the computation, adjustment and any partitioned computations.

8. The computer program product of claim 7, wherein the method further includes profiling memory usage to generate memory profile results for tailoring the at least one ML program, including:
    profiling I/O memory by analyzing how the at least one ML program uses I/O memory buffers; and
    profiling weight memory by analyzing how the at least one ML program uses weight memory buffers.

9. The computer program product of claim 7, wherein the model parameter data is loaded from at least one model file associated with the at least one ML program.

10. The computer program product of claim 7, wherein the method further includes scheduling the at least one enclave into at least one processor such that memory usage does not exceed a memory budget.

11. The computer program product of claim 10, wherein scheduling the at least one enclave further includes:
    receiving a new ML program execution request;
    determining that launching the at least one enclave will cause page swapping using a pre-calculated memory requirement; and
    scheduling the at least one enclave into the at least one processor by waiting until enough memory space becomes available for the at least one enclave.

12. The computer program product of claim 7, wherein the method further includes terminating the at least one enclave.

13. A system for efficient and scalable enclave protection for machine learning (ML) programs, comprising:
    a memory device having program code stored thereon; and
    at least one processor device operatively coupled to a memory device and configured to execute program code stored on the memory device to:
        tailor at least one ML program to generate at least one tailored ML program for execution within at least one enclave by:
            allocating a shared memory for computing a plurality of layers of a neural network, the shared memory reducing total memory usage during the computation of the plurality of layers;
            loading model parameter data for each of the plurality of layers onto the shared memory on-demand;
            addressing memory usage dependencies of the layers using inter-layer dependency resolution; and
            partitioning computation of any high memory usage layers into multiple sessions using intra-layer computation partitioning, the high memory usage layers including layers having a memory usage higher than a threshold memory usage for the at least one enclave; and
        execute the at least one tailored ML program within the at least one enclave, the executing the at least one tailored ML program within the at least one enclave comprising:
            computing the plurality of layers in a sequence using the shared memory, including loading weights for each layer to be executed on-demand;
            adjusting an allocation of extra shared memory for additional dependencies; and
            executing the at least one tailored ML program using the shared memory based on the computation, adjustment and any partitioned computations.

14. The system of claim 13, wherein the at least one processor device is further configured to execute program code stored on the memory device to profile memory usage to generate memory profile results for tailoring the at least one ML program by:
    profiling I/O memory by analyzing how the at least one ML program uses I/O memory buffers; and
    profiling weight memory by analyzing how the at least one ML program uses weight memory buffers.

15. The system of claim 13, wherein the model parameter data is loaded from at least one model file associated with the at least one ML program.

16. The system of claim 13, wherein the at least one processor device is further configured to execute program code stored on the memory device to schedule the at least one enclave into at least one processor such that memory usage does not exceed a memory budget by:
    receiving a new ML program execution request;
    determining that launching the at least one enclave will cause page swapping using a pre-calculated memory requirement; and
    scheduling the at least one enclave into the at least one processor by waiting until enough memory space becomes available for the at least one enclave.

17. The system of claim 13, wherein the at least one processor device is further configured to execute program code stored on the memory device to terminate the at least one enclave.

\* \* \* \* \*